(12) United States Patent
Numata et al.

(10) Patent No.: US 6,465,130 B1
(45) Date of Patent: Oct. 15, 2002

(54) LITHIUM MANGANESE COMPLEX OXIDE ANODE MATERIAL FOR LITHIUM SECONDARY BATTERIES AND A LITHIUM SECONDARY BATTERY USING THE SAME

(75) Inventors: Koichi Numata, Takehara (JP); Shintarou Ishida, Takehara (JP)

(73) Assignee: Mitsui Mining & Smelting Company, Ltd. (JP)

( * ) Notice: Subject to any disclaimer, the term of this patent is extended or adjusted under 35 U.S.C. 154(b) by 0 days.

(21) Appl. No.: 09/447,398

(22) Filed: Nov. 22, 1999

(30) Foreign Application Priority Data

May 21, 1999 (JP) ............................................. 11-141724

(51) Int. Cl.[7] .......................... H01M 4/50; H01M 4/46; H01M 4/40
(52) U.S. Cl. ................. 429/224; 429/231.1; 429/231.95
(58) Field of Search .................. 429/224, 218; 423/599

(56) References Cited

U.S. PATENT DOCUMENTS

| | | | | |
|---|---|---|---|---|
| 5,700,597 A | * | 12/1997 | Zhong | 429/218 |
| 5,759,717 A | * | 6/1998 | Amine | 429/218 |
| 5,807,646 A | * | 9/1998 | Iwata | 429/224 |
| 5,976,489 A | * | 11/1999 | Saidi | 423/599 |
| 6,040,089 A | * | 3/2000 | Manev | 429/231.1 |
| 6,110,442 A | * | 8/2000 | Xia | 423/599 |

FOREIGN PATENT DOCUMENTS

| | | | | |
|---|---|---|---|---|
| JP | 411071115 | * | 3/1999 | C01G/45/00 |
| WO | WO 9900329 | * | 1/1999 | C01G/45/00 |

* cited by examiner

*Primary Examiner*—Patrick Ryan
*Assistant Examiner*—Mark Ruthkosky
(74) *Attorney, Agent, or Firm*—Bierman, Muserlian and Lucas

(57) ABSTRACT

The anode material to be used for non-aqueous electrolyte secondary batteries according to the present invention is composed of a Li–Mn type complex oxide having a spinel structure, either or both of the occupancy rate ($g_c$) value of cations in an unit lattice of the material to be determined based on the composition, the lattice constant and the density or/and the ocupancy rate ($g_a$) value of anions in an unit lattice of the material to be determined based on the composition, the lattice constant and the density is/are adjusted to a value of 0.985 or less. The actions of the complex are partially substituted with aluminum or magnesium.

4 Claims, No Drawings

LITHIUM MANGANESE COMPLEX OXIDE ANODE MATERIAL FOR LITHIUM SECONDARY BATTERIES AND A LITHIUM SECONDARY BATTERY USING THE SAME

FIELD OF THE INVENTION

The present invention relates to a lithium secondary battery, particularly to an anode material to be used for non-aqueous electrolyte secondary batteries and lithium secondary battery using said anode material.

BACKGROUND ART

In recent years, electronic audio and visual devices and personal computers have rapidly been made into portable and cordless forms and the need for small secondary batteries having light weight and high energy density as the power source has greatly increased.

In this sense, there is a great expectation for non-aqueous secondary batteries, particularly lithium secondary batteries, as a battery workable in having high voltage and high energy density. Intensive research and development works for obtaining a layer structure compound of $LiCoO_2$, $LiNiO_2$ or complex oxide wherein a part of the oxide being substituted with a transition metal element, capable of intercalating and deintercalating lithium as an active anode material which comply with the requirement as described above, have been carried out until today. Furthermore, as materials having no layer structure, researches on $LiMn_2O_4$ as a cheap material having high voltage as much as 4V similar to $LiCoO_2$, etc. and on $LiMnO_2$ having relatively-low voltage as much as 3V, both are hereinafter collectively called as lithium manganate, have been also carried out.

In synthesizing of lithium manganate, it is preferable to use a material with high purity as much as possible as a raw material, however, from cost point of view, it is preferable to use any of cheap natural manganese oxide, electrolyzed manganese oxide manganese carbonate, etc., which have been used for primary batteries in the past.

However, the lithium manganate obtained by simply adjusting the composition and then calcining it, has problems such as getting lower cycling property at both normal temperatures and high temperatures from 60 to 80° C. and getting lower preserving properties.

DISCLOSURE OF THE INVENTION

It is an object of the present invention to improve charging and discharging cycle property of the anode material by intentionally causing the deficit of cations and anions by means of optimizing the condition for calcining, adding different types of elements or the like, in order to solve the problems as described above.

The inventors of the present invention found that such improvement of charging and discharging cycle property can be achieved by optimizing the condition for synthesizing lithium manganate, whereby increasing the deficit amount of cations and anions in the crystal structure thereof, and they have reached to accomplish the present invention.

The first invention of the present invention based on such finding is related to a Li–Mn type complex oxide compound having a spinel structure, characterized in that either or both values of the occupancy rate ($g_c$) of cations in an unit lattice to be determined based on the composition, the lattice constant and the density and/or the occupancy rate of anions ($g_a$) in an unit lattice to be determined based on the composition, the lattice constant and the density is 0.985 or less.

The second invention of the present invention is characterized in that, a part of cations in a spinel structure represented by a formula, $LiMn_2O_4$, of the Li–Mn type complex oxide compound having a spinel structure is substituted by at least one element selected from a group consisting of Na, K, Co, Al, Mg, Ti, Cr, Fe, Cu and Ni.

The third invention of the present invention is characterized in that, the Li Mn type complex oxide compound having a spinel structure is $LiMn_{2-x}Al_xO_4$, which is substituted with Al.

The forth invention of the present invention as to a lithium secondary battery is characterized in that the spinel-type lithium manganate is used as the anode material to be used for a lithium secondary battery.

DETAILED EXPLANATION ON THE INVENTION

Now, the present invention is further described in detail with referring the best embodiments described below, however, it should be noted that the present invention shall not be construed within a scope of such embodiments.

The anode material for lithium secondary batteries according to the present invention is the material which can improve the cycle property of the battery when the occupation ratio of either or both of the cations or/and the anions described above is adjusted to a value 0.985 or less as shown in the examples described below.

In the present invention, as a representative example for the Li–Mn type complex oxide compound having a spinel structure, $LiMn_2O_4$ can be given, whereas as an example for a complex oxide compound wherein a part of cations therein being substituted, $LiMn_{2-x}Al_xO_4$, which is substituted with Al, can be given, however, the anode material according to the present invention shall not be limited to those compounds.

As examples for the element other than Al to be used for substituting a part of the cations, any of elements such as Na, K, Co, Mg, Ti, Cr, Fe, Cu and Nl can be given.

The reason to add such elements given above is to strengthen the binding between a metal element in the spinel and oxygen, thereby preventing collapse of the crystal structure to be caused along with charging and discharging cycles.

In general, lithium manganate applicable for 4V-class lithium secondary batteries has spinel-type crystal structure.

The general formula for the spinel-type crystal structure is represented by a general formula of $AB_2O_4$, and lithium manganate is represented by a general formula of $LiMn_2O_4$, for example.

The lattice constant is defined here as the size of a minimum repeating unit (an unit lattice) of crystals.

In case of the cubic crystals in a spinel structure, only the lattice constant $\underline{a}$ is used as a parameter (b=c=a, $\alpha=\beta=\gamma=90°$), and the lattice constant $\underline{a}$ of lithium manganate is approximately 8 Å, for example.

In an ideal case, 8 times number of elements based on the number of elements existing in a general formula are contained in an unit lattice, namely 8 elements of Li, 16 elements of Mn and 32 elements of O are existing therein.

Therefore, in case that no existence of ion deficit is assumed, the density can be known by determining the lattice constant according to a diffraction method, while amount of the deficit can be determined based on the lattice constant and the density.

Hereunder, an example of the deficit amount caused by the difference in calcining temperature is shown. It should be noted that the example below is just an example and there is no constraint on the calcining temperatures to cause the deficit. In the present invention, the anode materials whose occupancy rate is less than a given range can be preferably used irrespective of pressure of the preparation conditions.

In case of $LiMn_2O_4$, when the composition of the starting material is $Li_{1.00}Mn_{2.00}O_{4.00}$, the product prepared after calcining at 700° C. will be $Li_{0.97}Mn_{1.00}O_{3.93}$. In case of cations, the occupancy rate is obtained from an equation 0.97+1.96=2.93, which is then divided by 3 to give a ratio of 0.977. Whereas, in case of anions, the occupancy rate is obtained by dividing 3.03 by 4 to give a ratio of 0.985.

Further, when the product is prepared by calcining at 900° C., the product becomes $Li_{0.99}Mn_{1.97}O_{3.96}$. In case of cations, the occupancy rate is obtained from an equation, 0.99+1.97=2.96, which is then divided by 3 to give a ratio of 0.987. Whereas, in the case of anions, the occupancy rate is obtained by dividing 3.95 by 4 to give a ratio of 0.988.

As obvious from the data obtained at a high calcining temperature, the occupancy rate of ions exceeds a given value, which shows that the material has changed into non-preferable one.

In case of $LiMn_{2-x}Al_zO_4$ of which part of cations having substituted with Al, $Li_{0.95}Mn_{1.04}Al_{0.10}O_{3.90}$ is obtained when the composition of the starting materials $Li_{1.00}Mn_{1.90}Al_{0.10}O_{4.00}$ and the starting material is prepared by actually calcining at 700° C. The occupancy ratio of cations is calculated from an equation, 0.98+1.84+0.10=2.92, which is then divided by 3 to give a rate of 0.973, while the occupancy ratio of anions is obtained by dividing 3.95 by 4 to give a ratio of 0.975.

Whereas, when the $LiMn_{2-x}Al_3O_4$ described above is prepared by calcining at 900° C., $Li_{0.99}Mn_{1.86}Al_{0.11}O_{3.91}$ is obtained. The occupancy ratio for the cations is calculated from an equation, 0.99+1.86 +0.11=2.96, which is then divided by 3 to give a ratio of 0.987, while the occupancy ratio for the anions is calculated a 0.978 by dividing 3.91 by 4.

Namely, the occupancy rate of ions is determined as one more than a given value when the calcining temperature is high, which thus shows that material has changed into an undesired one.

Using the anode material for lithium secondary batteries according to the present invention, improvement in the cycle property of a battery can be expected as the anode material has an adequate amount of ion deficit as described above.

And, the invention of a lithium secondary battery according to the present invention is constituted by using the anode material for lithium secondary batteries described above as an anode active material.

Whereas, in the present invention, as a cathode material usable for the lithium secondary battery according to the present invention, any materials capable of absorbing, storing and releasing metal lithium and lithium can be used without limitation, while as an electrolyte, any solvents, such as an organic solvent, including carbonates, sulfolanes, lactones and ethers, which contains a lithium salt, and a lithium ion conductive solid electrolyte, can be used without limitation.

EXAMPLES

Now, preferred embodiments for the present invention are explained here in below, however, it should be noted that the scope of the present invention shall not be construed within a scope described in the examples described below.

Example 1

Manganese oxide ($Mn_2O_3$) and lithium carbonate were weighed by using a balance at a ratio, Li:Mn=1:2, and were mixed by using a ball mill. The mixture obtained was then baked at 700° C. for 20 hours. After cooling, the mixture was crumbled and kept as a sample 1.

Example 2

The same procedure as described in example 1 was taken except employing a different Li–Mn ratio of Li:Mn= 1.05:1.95 to prepare a sample 2.

Example 3

The same procedure as described in the example 1 was taken except employing a different Li–Mn ratio of Li:Mn= 1.10:1.90 to prepare a sample 3.

Reference Example 1

The same procedure as described in the example 1 was taken except employing a different calcining temperature of 900° C. to prepare a sample ④.

Reference Example 2

The same procedure as described in the example 2 was taken except employing a different calcining temperature of 900° C. to prepare a sample ⑤.

Reference Example 3

The same procedure as described in the example 3 was taken except employing a different calcining temperature of 900° C. to prepare a sample ⑥.

Example 4

Manganese oxide ($Mn_2O_3$), aluminum hydroxide and lithium carbonate were weighed by using a balance at a ratio, Li:Mn:Al=1:1.9:0.1, and were mixed by using a ball mill. The mixture obtained was then baked at 700° C. for 20 hours. After cooling, the mixture was crumbled and kept as a sample 7.

Example 5

The same procedure as described in the example 1 was taken except employing a different Li-Mn-Al ratio, Li:Mn:Al=1.05:1.85:0.10, to prepare a sample 8.

Example 6

The same procedure as described in the example 1 was taken except employing a different Li-Mn-Al ratio, Li:Mn:Al=1.10:1.80:0.10, to prepare sample 9.

Reference Example 4

The same procedure as described in the example 4 was taken except employing a different calcining temperature of 900° C. to prepare a sample ⑩.

Reference Example 5

The same procedure as described in the example 5 was taken except employing a different calcining temperature of 900° C. to prepare a sample ⑪.

Reference Example 6

The same procedure as described in the example 6 was taken except employing a different calcining temperature of 900° C. to prepare a sample ⑫.

Quantitative analysis of each component element and assay of manganese value were carried out for each samples by employing ICP method and titration method. Composition rate of each component elements when fixing the ratio of oxygen at 4, a grating constant determined by X-ray diffraction and a density determined by gas substitution method are shown in Table 1.

TABLE 1

Analytical results of each samples

| Sample | Composition | | | | Lattice constant a (nm) | Calculated density (g/cm$^3$) | Measured density (g/cm$^2$) |
|---|---|---|---|---|---|---|---|
| | Li | Al | Mn | O | | | |
| ① | 0.98 | 0 | 1.99 | 4 | 0.8242 | 4.31 | 4.20 |
| ② | 1.03 | 0 | 1.95 | 4 | 0.8231 | 4.28 | 4.17 |
| ③ | 1.08 | 0 | 1.90 | 4 | 0.8219 | 4.23 | 4.12 |
| ④ | 1.00 | 0 | 1.99 | 4 | 0.8246 | 4.29 | 4.22 |
| ⑤ | 1.05 | 0 | 1.95 | 4 | 0.8240 | 4.24 | 4.19 |
| ⑥ | 1.10 | 0 | 1.91 | 4 | 0.8227 | 4.20 | 4.17 |
| ⑦ | 1.01 | 0.11 | 1.80 | 4 | 0.8227 | 4.24 | 4.13 |
| ⑧ | 1.04 | 0.11 | 1.86 | 4 | 0.8217 | 4.22 | 4.10 |
| ⑨ | 1.10 | 0.10 | 1.81 | 4 | 0.8201 | 4.17 | 4.06 |
| ⑩ | 1.01 | 0.11 | 1.90 | 4 | 0.8228 | 4.23 | 4.17 |
| ⑪ | 1.07 | 0.11 | 1.86 | 4 | 0.8223 | 4.17 | 4.15 |
| ⑫ | 1.13 | 0.10 | 1.82 | 4 | 0.8214 | 4.12 | 4.11 |

Further, the results of the occupancy rates of cations and anions in an unit lattice determined based on the data in Table 1 are shown in Table 2.

Whereas, coin batteries were prepared by using each sample of the anode materials as an anode and metal lithium as an cathode to evaluate the charging and discharging performance of an anode. For an electrolyte, IM LIPF$_6$/EC+DMC solution was used, and charging and discharging tests were carried out at a cut voltage ranging from 3.0 to 4.3V and at 5 hours time rate. The capacity maintaining rates at the tenth cycle are shown in Table 2.

TABLE 2

| Sample | Occupancy rate | | Capacity maintaining rate at 10th cycle (%) |
|---|---|---|---|
| | Cation | Anion | |
| ① | 0.977 | 0.983 | 99.2 |
| ② | 0.977 | 0.983 | 100 |

TABLE 2-continued

| Sample | Occupancy rate | | Capacity maintaining rate at 10th cycle (%) |
|---|---|---|---|
| | Cation | Anion | |
| ③ | 0.973 | 0.978 | 99.5 |
| ④ | 0.987 | 0.988 | 65.0 |
| ⑤ | 0.990 | 0.988 | 80.2 |
| ⑥ | 0.993 | 0.990 | 92.6 |
| ⑦ | 0.973 | 0.975 | 99.8 |
| ⑧ | 0.970 | 0.970 | 100 |
| ⑨ | 0.970 | 0.968 | 100 |
| ⑩ | 0.987 | 0.978 | 92.7 |
| ⑪ | 0.997 | 0.983 | 94.3 |
| ⑫ | 1.00 | 0.980 | 98.4 |

As shown in Table 2, the samples ① through ③ obtained respectively in the examples 1 through 3 were found to have an excellent capacity maintaining rate at the tenth cycle.

Similarly, the samples ⑦ through ⑨ obtained respectively in the examples 4 through 6 were also found to have an excellent capacity maintaining rate at the tenth cycle.

As described above including examples, the present invention enables to improve charging and discharging cycle performance of a battery by intentionally causing the deficit of cations and anions.

What is claimed is:

1. An anode material for lithium secondary batteries comprising a Li–Mn complex oxide having a spinel structure wherein either or both of the occupancy ratio (g4) of cations in a unit lattice which is determined based on the composition and the material density and/or the occupancy value (g4) of anions in a unit lattice which is determined on the composition, lattice constant and the material density is adjusted to a value of 0.985 or less, a portion of the cations in the Li–Mn complex oxide is replaced with aluminum or magnesium.

2. The anode of claim 1 wherein Li–Mn complex oxide has the formula LiMn$_{2-x}$Al$_x$O$_4$.

3. A lithium secondary battery having as the anode, the anode material of claim 1.

4. A lithium secondary battery having as the anode, the anode material of claim 2.

* * * * *